UNITED STATES PATENT OFFICE.

EDWARD D. KENDALL, OF JERSEY CITY, NEW JERSEY, ASSIGNOR TO THE AMERICAN COAL TAR COLOR COMPANY OF NEW YORK.

WRITING-INK.

SPECIFICATION forming part of Letters Patent No. 273,240, dated February 27, 1883.

Application filed March 26, 1881. (Specimens.)

*To all whom it may concern:*

Be it known that I, EDWARD D. KENDALL, of Jersey City, in the county of Hudson and State of New Jersey, have invented a certain new and Improved Writing-Ink, of which the following is a specification.

This invention relates more particularly to that class of ink made with so-called "coal-tar colors," carmine, and other fugitive colors; and its purpose is to shield writings from the action of the air, which, particularly in the presence of moisture, causes said coloring-matter to fade or quite disappear. I effect the required object by combining with colorific substances a resinous matter, under such circumstances that while the said resin in the ink is in aqueous solution in the dried writing made with the ink it is insoluble in water. The resinous matter that I prefer to use is lac-resin in the form known as shellac. I do not confine myself to the use of shellac, as other resins may be used, but with less advantage, on account of their qualities or with reference to economy.

To prepare my ink I grind, say, about one ounce of the said resin to a coarse powder, which powder I moisten with, say, about one fluid ounce of alcohol of ninety-five per cent. proof preferably; but a stronger or somewhat weaker alcohol may be used. The powdered resin is to be thoroughly stirred while the alcohol is being poured on it, so that every part of the powder is well moistened. The mixture is then allowed to stand one day in a close-covered vessel. I then add, say, about two fluid ounces of the strongest procurable aqueous solution of ammonia—that which is known as "stronger water ammonia U. S. P." will answer—and by frequent agitation of the mixture during several days I effect a solution of the resin. I then add cold water in varying proportions—say from ten to twenty times the volume of the aqua-ammonia employed, according to the nature of the coloring-matter employed, the coloring substances that are more soluble in water requiring the greatest proportion of resinous matter for the protection of writings made with them. My ink is completed by decanting or filtering the above-described aqueous solution of resin, and then adding to it a proper quantity for producing the desired shade of any available colorific substance—for example, a coal-tar color or carmine.

I am aware that writing-ink has been composed of bichromate of potash, logwood, borax, shellac, and ammonia; and I am also aware that an ink has been composed of extract of logwood dissolved in water with potassium bichromate and gum-mucilage. I do not make any claim to either of the inks above described. My ink is composed of three ingredients—ammoniacal aqueous solution, resin, and coloring-matter; and the great advantage of this ink is that after writing the ammonia evaporates, leaving the coloring-matter protected by a thin impervious coating of shellac or other resin.

What I claim as my invention, and desire to secure by Letters Patent, is—

A writing-ink composed of an ammoniacal aqueous solution, a resin or resins, and coloring-matter, in about the proportions herein described.

In testimony whereof I have hereunto set my hand and seal in the presence of two subscribing witnesses.

EDWARD D. KENDALL. [L. S.]

Witnesses:
CHAS. M. PECK,
A. E. MILLER.